United States Patent [19]
Janssen et al.

[11] Patent Number: 5,383,190
[45] Date of Patent: Jan. 17, 1995

[54] METHOD OF IMPROVING THE TRANSMISSION OF DATA PACKETS HAVING DIFFERENT PRIORITIES IN ACCORDANCE WITH THE DQDB PROTOCOL

[75] Inventors: Sander J. L. M. Janssen, The Hague; Thomas D. Poelhekken, Leiden, both of Netherlands

[73] Assignee: Koninklijke PTT Nederland N.V., Groningen, Netherlands

[21] Appl. No.: 23,199

[22] Filed: Feb. 25, 1993

[30] Foreign Application Priority Data

Mar. 4, 1992 [NL] Netherlands ............... 9200405

[51] Int. Cl.$^6$ .................... H04J 3/16; H04L 12/40
[52] U.S. Cl. .................... 370/85.6; 370/85.8; 370/85.9
[58] Field of Search .............. 370/85.6, 85.7, 85.8, 370/85.9, 85.1, 76, 84; 340/825.06, 825.07, 825.08, 825.49, 825.17, 825.36

[56] References Cited

U.S. PATENT DOCUMENTS 5,185,737  2/1993  Nassehi et al. ............... 370/85.8

FOREIGN PATENT DOCUMENTS

0385431A2  9/1990  European Pat. Off.
0393293A1  10/1990  European Pat. Off.
0400500A2  12/1990  European Pat. Off.
0448494A2  9/1991  European Pat. Off.

*Primary Examiner*—Wellington Chin
*Assistant Examiner*—Huy D. Vu
*Attorney, Agent, or Firm*—Frishauf, Holtz, Goodman & Woodward

[57] ABSTRACT

Method of transmitting information having different priorities in accordance with the DQDB protocol, in which a head station ($4_1$, $4_2$) of a transmission channel (1, 2) always assigns to every time slot a priority by means of a code in the access field and an end station ($5_1$, $5_2$) of each transmission channel always stores periodically the number of access units ($3_1$, $3_2$, $3_3$) which transmit information having different priorities in time slots having a corresponding priority, and in which the ratio of the numbers of time slots which have different priorities and which are emitted by the head station is adjusted accordingly. Two different ways of storing the number of access units having different priorities are discussed. According to a first way, all the active access units report their priority periodically and according to a second way, all the nonactive access units report and access units having a higher priority which become active/inactive send start/stop codes.

2 Claims, 2 Drawing Sheets a b c d a b c d

METHOD OF IMPROVING THE TRANSMISSION OF DATA PACKETS HAVING DIFFERENT PRIORITIES IN ACCORDANCE WITH THE DQDB PROTOCOL

The invention relates to a method of transmitting information in the form of data packets in a communication network which comprises two unidirectional transmission channels having opposite directions of transmission and a series of consecutive access units which are each coupled to both the first and the second transmission channel, information to which different priorities may be assigned, being transferred, under the control of clock signals, respectively from the first to the last access unit connected to the one transmission channel and from the last to the first access unit connected to the other transmission channel, and head stations coupled to the start of each transmission channel generating consecutive time slots which always comprise the same predetermined number of clock signal cycles, in which time slots at least a number of information bits can be written, and an end station being coupled to the end of each transmission channel.

Such a method is disclosed in the European Patent Application EP-A-0203165 under the name QPSX protocol, but it has now become better known in circles skilled in the art under the name DQDB protocol, which name will therefore be retained hereinafter. The DQDB protocol is now also specified in the IEEE Standard 802.6.

As shown diagrammatically in FI6. 1, according to the DQDB protocol use is made of two transmission channels 1 and 2, in general data buses with mutually opposite communication directions. Connected to both buses is a series of consecutive access units $3_1, 3_2 \ldots 3_n$. Connected to the start of each bus is a head station, $4_1$ and $4_2$, respectively, and connected to the end of each bus is an end station, $5_1$ and $5_2$ respectively.

As shown diagrammatically in FIG. 2, the information to be transmitted is transmitted in time slots having a fixed size of 53 octets. The first octet forms the so-called access field. The next 4 octets form the so-called header of the time slot and the remaining 48 octets, the data field, may contain the actual data to be transmitted. Since the structure of the access field is important for the present invention, the subdivision thereof in accordance with the IEEE 806.2 Standard is shown in more detail in FIG. 2. The access field contains the following bits in succession. A Busy (B) bit which indicates whether the data field of the time slot is or is not occupied. A Slot Type (ST) bit which indicates whether the data field is intended for isochronous or nonisochronous services. A Previous Segment Released (PSR) bit, which indicates whether the preceding time slot has been read out by an access unit, this bit can be used in order to reset the Busy bit in a time slot which has already been read out, as a result of which said slot can be reused and the transmission efficiency increases. The fourth and fifth bit in the standard are still free and are designated as reserve bits. The sixth, seventh and eighth bit are so-called Request (R) bits, with which an access unit can ask to be allowed to transmit information with a particular priority.

Access units 3 which have data to transmit select one of the two buses, for example using as criterion the position of the access unit to which the data has to be sent. The data packets to be transmitted are sent via the passing time slots after an access protocol for access to the respective time slots has first been run. Said access protocol proceeds as follows:

An access unit which receives a message for transmission in the transmission direction of bus 1, sets, as soon as possible, a request bit in one of the last three bit positions of the first octet, the access field, of a time slot on bus 2. As a result, the access units in the transmission direction of bus 2, that is to say opposite to the transmission direction of bus 1, are informed that a message is ready for transmission on bus 1 and that said access units must allow an empty time slot to pass. In this way, a distributed FIFO buffer is, as it were, built up for each bus.

Within the DQDB Standard there is also the possibility of assigning a particular priority to the data packets to be transmitted. Packets having a high priority have a greater chance of being transmitted quickly than packets having a lower priority. It is known, however, that when the loading of the DQDB network is high, the ratio in the permitted bandwidths for access units having packets to send which have a high (H), a medium (M) and a low (L) priority is unpredictable under the existing priority mechanism and that there is a large difference in bandwidth between access units having the same priority. If, for example, it is desired to transmit video signals having a high priority via a DQDB network in the future, as is the intention, it is necessary for the priority mechanism to be predictable and adjustable even with a very high loading of the network.

The object of the invention is to provide a method which offers this possibility and which is, in addition, compatible with the present priority mechanism specified for DQDB and is not inconsistent with the other specifications within the DQDB Standard.

For this purpose, the invention provides a method of the abovementioned type, which has the characteristic that a head station of a transmission channel always assigns a priority to each time slot by means of a code in the access field and that an end station of each transmission channel always stores periodically the numbers of access units which communicate with different priorities and that the ratio of the numbers of time slots which have different priorities and which are emitted by the head stations is adjusted accordingly.

According to a first embodiment of the invention, the numbers of access units which communicate with different priorities are stored by the head station associated with the one bus transmitting a trigger code which is incorporated in the access field, each active access unit on the other bus placing, after receiving the trigger code, a code in the access field of a subsequent time slot on the one bus, which code is representative of the priority with which said access unit communicates and by the end station of the one bus determining from said codes the numbers of active access units on the other bus having different priority and passing said numbers to the head station of the other bus.

According to a second embodiment of the invention, the numbers of access units which communicate with different priorities are stored by the head station associated with the one bus transmitting a trigger code which is incorporated in the access field, each nonactive access unit on the other bus placing, after receiving the trigger code, a first code in the access field of a subsequent time slot on the one bus, by each access unit which enters the active or inactive state on the other bus and which desires to communicate or has communicated with a higher priority, respectively, placing a second code in the access field of a subsequent time slot on the one bus and by the end station of the one bus determining from said codes the numbers of active access units having different priority on the other bus and passing the ratio thereof to the head station of the other bus.

This method has the advantage that the adjustment of the ratio can take place more quickly. In order not to load the channel too heavily, it is preferable to arrange for the nonactive access units to send a code instead of the active access units. In most cases, the number of nonactive access units will, after all, be smaller at high bus loads than the number of active access units. In principle, however, it is also possible to determine the number of active access units by arranging for them to transmit an active code.

The invention will be explained below on the basis of exemplary embodiments with reference to the drawing, wherein FIG. 1 shows a diagrammatic representation of a DQDB network;

Figure 1:
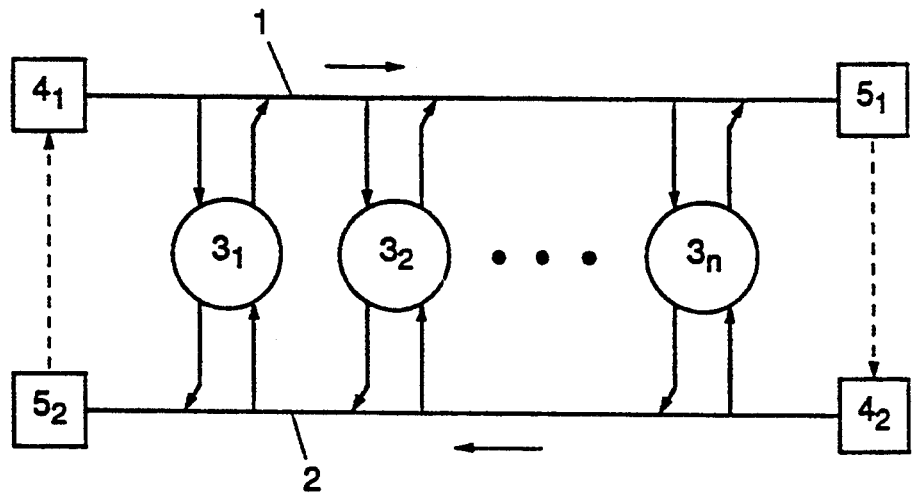
Figure 2:
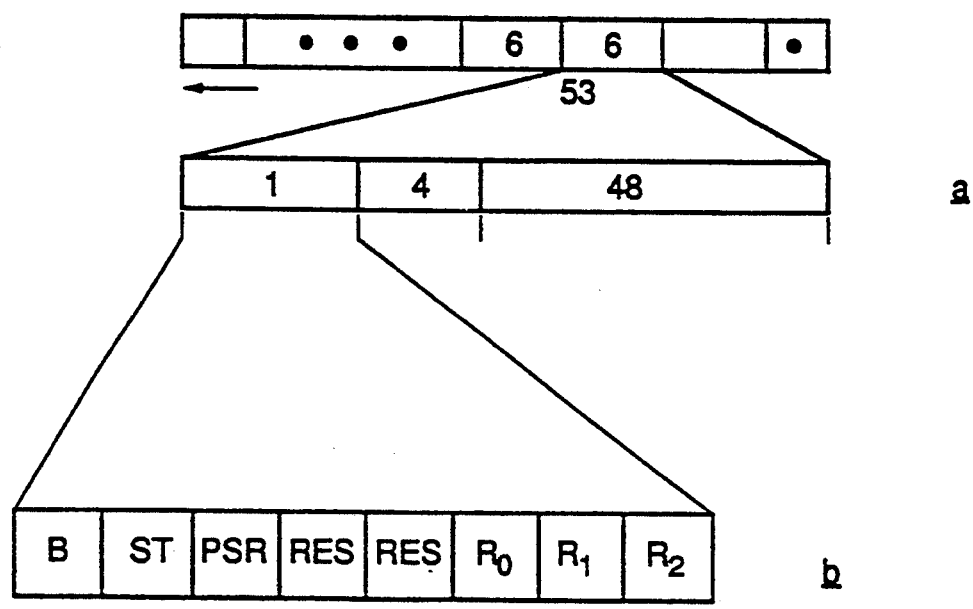
FIG. 2a shows the subdivision of a time slot used in a DQDB.
FIG. 2b shows the subdivision of the access field of such a time slot in accordance with the DQDB Standard.
Figure 3:
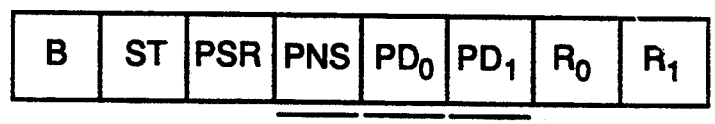
Figure 3:
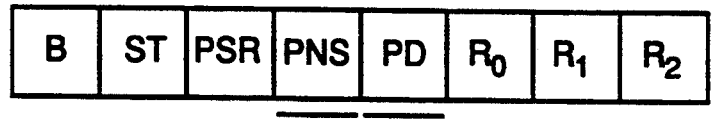
Figure 3:
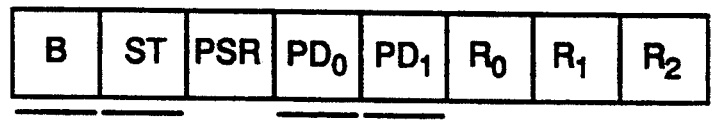
Figure 3:
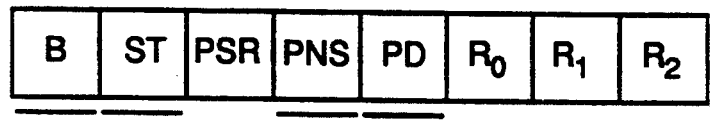

FIG. 3a-d shows various versions of the subdivision of the access field shown in FIG. 2b for various embodiments of the priority recognition mechanism according to the invention.

It is pointed out that hereinafter, for the sake of brevity, access units which have a packet having a high priority to transmit will be denoted by H access unit and access units which have a packet having a medium or low priority to transmit will be denoted by M and L access unit, respectively. The invention will first be explained in the case of two priorities.

According to a first aspect of the invention, the priority of the time slot is specified in each DQDB time slot. As a result from a logical point of view, partly separated networks are produced in which each priority has its own bandwidth: $B_H$ for the H access units and $B_L$ for the L access units. The time slot generator in the head station of a bus generates a-times as many H time slots for the H access units as for the L access units. As a result, the ratio of the available bandwidth for the H access unit and the L access unit is on average equal to a. This remedies the problem of the existing priority mechanism that the ratio between the access units having packets with different priorities is unknown. As a consequence of the characteristics of the DQDB protocol, all the H access units gradually arrive at a fair distribution of the available bandwidth $B_H$ and the same applies to the L access units and $B_L$. The way in which the priority of each time slot can be coded in the access field will be explained in more detail below.

According to a second aspect of the invention, if the number of H and/or L access units alters, the distribution of the time slots available for the different priorities is adjusted by the time slot generators of the DQDB system. Such an alteration can be signalled in two ways:

According to a first method (I) with the aid of priority codes, and this takes place in the following way: after a "trigger code" has been sent periodically by the head station (HOB) $4_2$ of bus 2, all the active access units on bus 1 report their priority. After the so-called priority codes have been analyzed by the end station (EOB) $5_1$ of bus 2, the bandwidth distribution on bus 1 is periodically adjusted. For the other bus 2, the process is carried out in an identical way.

According to a second method (II) with start/stop codes, and this takes place as follows: after a "trigger code" has been sent periodically on bus 2, only the nonactive access units on bus 1 report. Here it is assumed that the total number of access units is known. The H access units on bus 1 report by means of "start/stop codes" on bus 2 as soon as such a unit enters an active or inactive state. After reception by the end station $5_2$ of bus 2, the bandwidth distribution on bus 1 is immediately adjusted. Correction for the number of active L access units takes place periodically, after analysis of the codes generated in response to the trigger code.

Two situations are distinguished for the distribution of the time slot priorities, depending on the network loading p:

loading less than or equal to $\rho$:
$R_H + R_L \leq \rho S \Rightarrow S_L = R_L$ and $S_H = R_H$, loading greater than $\rho$:
$R_H + R_L > \rho S \Rightarrow S_H/S_L = aN_H/N_L$, $N_H + N_L = N_A$ and $S_H + S_L = S$ $\Rightarrow S_H = aSN_H/[N_A + (a - 1)N_H]$, where $R_H$ and $R_L$ are, respectively, the total flow of H and L requests, $S_H$ and $S_L$ are, respectively, the total flow of H and L time slots, S is the total (maximum) time slot flow, N is the total number of logical access units, $N_A$ is the number of active logical access units, and $N_H$ and $N_L$ are, respectively, the number of H and L access units.

For the purpose of clarification, it is pointed out that a single physical access unit, such as $3_1$, $3_2$ etc., can be thought of as consisting of two or three logical access units corresponding to the number of priorities present in the system.

This means that, with a light to heavy loading, i.e. a loading $\leq p$, the request stream is directly mapped onto the time slot stream. In this case, an H request does have priority over an L request in the same access field. In the case of extremely heavy loadings, i.e. a loading >p, the flow of H time slots is determined on the basis of the number of H access units and the total number of active access units.

The limit value p can be determined by measuring the total request flow in the end station with the aid of a so-called Request Stream Counter (RS_CNTR). In order to avoid instability, it is desirable to take an average over a period to be determined more precisely. A possible limit for the network loading, which has been determined using simulation results, is p=90%.

In order to detect the priority type of the active access units of bus 1, the head station $4_2$ sends a trigger code to bus 2 with a periodicity T, T being expressed in integer time slot times. Said trigger code is sent only if the network loading moves above the limit p. In all other cases, the head station sends an "idle code", hereinafter called "unused code", i.e. a code to which an access unit does not react.

After receiving the trigger code on bus 2, the access units, in the case of method I place a priority code regarding their status on bus 1 into the next time slot, and in the case of method II, depending on the status of the access unit on bus 1, possibly place a nonactive code into the next time slot. H access units entering an active or inactive state send a start/stop code. The end station $5_2$ of bus 2 receives, in the case of method I, an avalanche of codes following the trigger code, and therefrom determines the number of active access units and the priority distribution. In the case of method II, the number of active access units and the priority distribution is determined on the basis of the nonactive codes which are received by the end station $5_2$ of bus 2 in reaction to a trigger code, in combination with the start/stop codes. In both methods, the information obtained by the end station $5_2$ is passed to the head station $4_1$ of bus 1, and this head station adjusts the bandwidth distribution.

It can be seen from the above that the way in which $N_A$, $N_H$ and $N_L$ are determined, is different for method I and II, and this will be clarified below in more detail.

In the case of method I, all the active access units react to the trigger code by sending a priority code. The priority codes transmitted by an active H and L access unit differ from each other. The end station is able to determine the number of active H access units $N_H$ and the number of active L access units $N_L$ in a simple manner by counting these codes with the aid of a high priority counter and a low priority counter. The sum of these two counters gives $N_A$.

If a new H access unit wants to start sending, it makes use in the first instance of a part of the existing $B_H$ bandwidth. An extension of said bandwidth takes place after the avalanche of priority codes, initiated by the trigger code, has reached the end station and the information obtained has been passed to the head station of the other bus. This adjustment may, at worst, therefore be delayed by one period T. On the other hand, after an H access unit has stopped, the remaining H access units will share the extra bandwidth for a maximum of one period, before the bandwidth distribution is corrected. The same applies mutatis mutandis to the L access units. The minimum size of the periodicity T is the maximum length of the stream of priority codes. Since a maximum of N logical access units is connected to a bus, the minimum periodicity is N+1 in principle.

In the case of method II, only the nonactive access units react to the trigger code. The nonactive codes which are transmitted in reaction thereto are identical and are registered in a nonactive counter. The difference with N, the known total number of access units, is then used to determine the number of active access units $N_A$. Only the H access units send start/stop codes when they become active and inactive, respectively. The count value of a high priority counter in the end station increases on reception of a start code and decreases on reception of a stop code. The contents of the high priority counter are thus equal to $N_H$. The difference between $N_A$ and $N_H$ is used to calculate $N_L$.

The start/stop codes are sent via the same channel as the nonactive codes. A different code is used for the start/stop code than for nonactive code.

An H access unit starting up may delay a nonactive code by overwriting it and placing the nonactive code in the following idle code. Consequently, the bandwidth enlargement for an H access unit starting up is effected more quickly.

Because L access units do not send a start/stop code, the bandwidth distribution for L access units is adjusted, just as in the case of method I, after at most one period T.

In the case of method II, T is larger than in the case of method I, because in addition to the at most N+1 nonactive codes, there also has to be room for sending start/stop codes.

As already stated above, according to a first aspect of the invention a new mechanism is provided for specifying the priority of a DQDB slot. Time slots having a high or a low priority in this case may only be taken up by an H or an L access unit, respectively. According to the invention, this possible in two different ways:

The first way is by means of a bit in the access field, which bit specifies the priority of the following time slot, the so-called (PNS) bit. In this case, the 4th bit from the access field of the DQDB time slot is used to specify the priority of a time slot. This bit is still free in the IEEE standard. In order to prevent an access unit from having to wait for 4 bits before it can determine whether it is allowed to use a respective time slot, the time slot priority is running ahead by one time slot. For the time slots having a high and a low priority, the code 1 and 0 is used, respectively.

The second way makes use of a combination of the time Slot Type (ST) bit and the Busy (B) bit. The coding ST B=1 0, which has not yet been defined in the IEEE standard, is used for specifying an empty time slot having a high priority. The code 0 0 specifies an empty time slot having a low priority. This method introduces a delay of two bits, i.e. one more bit than in the standard protocol, because only after reading the ST bit (the 2nd bit) is it clear which priority the time slot has. In this context it can be pointed out, however, that with current implementations of the DQDB protocol, data processing is 8-bit parallel, and consequently no use is made of the 1-bit read/write method as specified in the IEEE standard. With 8-bit parallel processing the drawback mentioned earlier, that of a delay occurring, no longer applies.

There are various possibilities of combining the two ways described above, for specifying the priority of a time slot by means of a code in the access field, with the methods I and II described above for determining the priority distribution of the access units connected to a bus, likewise by means of a code in the access field. Said different ways of coding are indicated diagrammatically in FIG. 3, the bit positions in the access field, which are used for the various forms of coding, always being underlined in the figure.

A first way of coding is explained with reference to FIG. 3a. If use is made of only two priorities, only two request bits are necessary, and the remaining reserve bit and the first request bit $R_0$ are now used as Priority Detection (PD) bits, $PD_0$ and $PD_1$, respectively. Various codes can be formed with said two PD bits, a distinction being made between the methods I and II:

| Method I: | | |
|---|---|---|
| PD1 | PD0 | |
| 1 | 1 | trigger code/H priority code |
| 0 | 1 | L priority code |
| x | 0 | unused code |

The H priority code has been chosen so as to be identical to the trigger code, because in that case it is immediately clear after reading the PD0 field, whether it does or does not relate to an unused code.

| Method II: | | |
|---|---|---|
| PD1 | PD0 | |
| 1 | 1 | trigger code/nonactive code |
| 0 | 1 | H start code |
| 1 | 0 | H stop code |
| 0 | 0 | unused code |

A second way of coding is shown in FIG. 3b and is actually identical to the first method, but only one PD bit is used now, for which the reserve bit is employed. This way has the advantage that no bit positions are used which, according to the DQDB protocol already have a defined meaning, namely that of request bit. Codes cannot be formed with one PD bit. Together with the PD bits in the following two time slots, however, a three-bit code can be formed.

| Method I: | | | |
|---|---|---|---|
| PD2 | PD1 | PD0 | |
| 1 | 1 | 1 | trigger code/H priority code |
| 0 | 0 | 1 | L priority code |
| x | x | 0 | unused code |

In this case, PD0, PD1 and PD2 therefore belong to three consecutive time slots. Although it is possible to code with the aid of 2 bits, the PD bit is preferably used in three consecutive time slots in order to minimise the probability of bit errors.

The H priority code, in turn, is identical to the trigger code because in that case it is immediately clear after reading the PD0 field whether it does or does not relate to an unused code.

| Method II: | | | |
|---|---|---|---|
| PD2 | PD1 | PD0 | |
| 1 | 1 | 1 | trigger code/nonactive code |
| 0 | 0 | 1 | H start code |
| 1 | 0 | 1 | H stop code |
| x | x | 0 | unused code |

A third way of coding is explained with reference to FIG. 3c. In this case, in order to prevent a reduction in the number of request bits, the priority indication is specified by a specific combination of the B and ST bit rather than by the PNS bit. The PNS bit can now be used as $PD_1$ bit and the reserve bit as $PD_0$ bit. The time slot priority information, however, is now no longer running ahead.

The same scheme as was used for the first way can be used for coding of PD1 and PD0, while the priority coding with the aid of the B and the ST bit makes use of the coding already mentioned earlier.

Hereinafter it will also be explained in what manner the principles on which the invention is based can be applied in the case of three different priorities, High (H), Medium (M) and Low (L).

Once again, a priority is assigned to each time slot. The head station generates a-times as many H time slots for the H access units as for the L access unit, and b-times as many as for the M access units. As a result, the ratio of available bandwidth for the H, M and L access units is fixed on average. All the H access units gradually distribute the available bandwidth $B_H$ in a fair manner, and the same applies to the M and L access units with respect to $B_M$ and $B_L$, respectively. If the number of H, M and/or L access units alters, the time slot generators of the DQDB system adjust the ratio of the numbers of time slots for the various priorities.

Two situations are again distinguished for the distribution of the time slot priorities, depending on the network loading p:

Loading less than or equal to $\rho$:
$R_H + R_M + R_L \leq \rho S \Rightarrow S_L = R_L, S_M = R_M$ and $S_H = R_H$, Loading greater than $\rho$:
$R_H + R_M + R_L > \rho S \Rightarrow S_H/S_L = aN_H/N_L,$
$S_H/S_M = bN_H/N_M,$
$S_H + S_M + S_L = S$ and
$N_H + N_M + N_L = N_A$
$\Rightarrow S_H = aSN_H/[N_A + (a-1)N_H + (a/b-1)N_M],$ where $R_H$, $R_M$ and $R_L$ are, respectively, the flow of H, M and L requests, $S_H$, $S_M$ and $S_L$ are, respectively, the flow of H, M and L time slots, S is the total (maximum) slot flow, N is the total number of logical access units, $N_A$ is the number of active logical access units, and $N_H$, $N_M$ and $N_L$ are, respectively, the number of H, M and L access units.

The determination of $N_A$, $N_H$, $N_M$ and $N_L$ is carried out in the same manner with a priority mechanism for three levels as with a priority mechanism for two levels.

For method I this means that a medium priority counter in the end station is required for the M access units. For method II, start/stop codes must in addition be sent by the M access units. To mark the priority of a DQDB time slot in the case of three priorities, a combination of the PNS, ST and B bit is used:

| ST | B | PNS | |
|---|---|---|---|
| 1 | 0 | 1 | H priority |
| 0 | 0 | 1 | M priority |
| 0 | 0 | 0 | L priority |

The ST bit and the B bit are incorporated in the current time slot and the PNS bit in the previous time slot. The PNS bit specifies that the following time slot has L priority or H/M priority. If the PNS bit specifies H/M priority, the combination of the B and the ST bit in the time slot itself clarifies whether M or H priority is involved.

In the case of a priority scheme having three levels there is only one possibility of combining the priority coding within the access field with a trigger code (method I) or with a start/stop code and a nonactive code (method II).

Only one PD bit is available for sending the codes. Although coding with the aid of 3 bits is possible, the PD bit is preferably used in four consecutive time slots in order to minimize the probability of bit errors:

| Method I: | | | | |
|---|---|---|---|---|
| PD3 | PD2 | PD1 | PD0 | |
| 1 | 1 | 1 | 1 | trigger code/H priority code |
| 0 | 0 | 1 | 1 | M priority code |
| 0 | 1 | 0 | 1 | L priority code |
| x | x | x | 0 | unused code |

| Method II: | | | | |
|---|---|---|---|---|
| PD3 | PD2 | PD1 | PD0 | |
| 1 | 1 | 1 | 1 | trigger code/nonactive code |
| 0 | 1 | 1 | 1 | H start code |
| 1 | 0 | 1 | 1 | H stop code |

| | | | | |
|---|---|---|---|---|
| 0 | 1 | 0 | 1 | M start code |
| 1 | 0 | 0 | 1 | M stop code |
| x | x | x | 0 | unused code |

In order to use the method according to the invention, the access units must be adjusted.

The access units must be able to detect a priority indication. This priority is specified in the access check field by the PNS bit or the ST+B bit or by a combination thereof. The access units must also be able to detect a trigger code, whereupon it must be possible to transmit priority codes, as with method I, or nonactive and start/stop codes as with method II.

For each priority a detection mechanism is required which determines which priorities are or are not active within an access unit. A possible implementation is a local buffer counter which represents the number of segments in the local buffer. Each priority, according to the IEEE 802.6 Standard, has a separate local buffer, therefore one local buffer counter is required per priority.

In the end station at the end of the bus, a counter is required for determining the total request flow $R_H+(R_M)+R_L$ arriving at the end of the bus. This request stream counter is used to determine whether the limit of pS is exceeded. In order to prevent instability, the average is taken over a time to be defined more precisely.

There has to be a possibility of communication from the end station of the one bus to the head station of the other bus, for the purpose of direct mapping of the request stream onto the empty time slot stream.

The head station must be able to confer a priority indication on a time slot and, in a time slot, must be able to send a trigger code behind which the access units indicate their activity. In all the other time slots, an unused code must be transmitted.

The end station must be able to read codes and to determine therefrom the number of active access units. For method I, in the case of three priorities, a high priority counter, a medium priority counter and a low priority counter are necessary to be able to store the priority codes. For method II, in the case of three priorities, a nonactive counter for counting the nonactive codes and a high priority counter and a medium priority counter for counting the start/stop codes are necessary.

We claim:

1. Method of transmitting information in the form of data packets in a communication network which comprises:
   a first and a second unidirectional transmission channel having opposite directions of transmission;
   a series of consecutive access units 1 to N which are each coupled to the first and to the second transmission channel;
   head stations coupled to the start of each transmission channel; and
   end stations coupled to the end of each transmission channel;
   the method comprising:
   transferring information to which higher and lower priorities may be assigned, respectively, from the first to the Nth access unit via the first transmission channel and from the Nth to the first access unit via the second transmission channel;
   generating at said head stations consecutive time slots which each comprises an access field including a fixed number of bit positions and in which time slots at least a number of information bits can be written;
   the head station of each transmission channel always assigning a priority to each time slot by means of a code in the access field,
   the end station of each transmission channel recording numbers per priority of access units communicating with the same priority; and
   the head station of each transmission channel assigning priorities to said consecutive time slots in conformity with those numbers per priority, recorded in the end station;
   and wherein:
   for said recording of said numbers per priority, the head station associated with said first transmission channel transmits a trigger code which is incorporated in the access field;
   each active access unit on said second transmission channel placing, after receiving said trigger code, a priority code in the access field of a subsequent time slot on said first transmission channel, which priority code is representative of a priority with which that active access unit communicates; and
   the end station associated with said first transmission channel records, after receiving said priority codes, said numbers per priority of active access units on the second transmission channel and passes said numbers per priority to the head station of the second transmission channel.

2. Method of transmitting information in the form of data packets in a communication network which comprises:
   a first and a second unidirectional transmission channel having opposite directions of transmission;
   a series of consecutive access units 1 to N which are each coupled to the first and to the second transmission channel;
   head stations coupled to the start of each transmission channel; and
   end stations coupled to the end of each transmission channel;
   the method comprising:
   transferring information to which higher and lower priorities may be assigned, respectively, from the first to the Nth access unit via the first transmission channel and from the Nth to the first access unit via the second transmission channel;
   generating at said head stations consecutive time slots which each comprises an access field including a fixed number of bit positions and in which time slots at least a number of information bits can be written;
   the head station of each transmission channel always assigning a priority to each time slot by means of a code in the access field,
   the end station of each transmission channel recording numbers per priority of access units communicating with the same priority; and
   the head station of each transmission channel assigning priorities to said consecutive time slots in conformity with those numbers per priority, recorded in the end station;
   and wherein:
   for said recording of said numbers per priority, the head station associated with said first transmission channel transmits a trigger code which is incorporated in the access field;

each nonactive access unit on said second transmission channel placing, after receiving said trigger code, a first code in the access field of a subsequent time slot on said first transmission channel;

each access unit which enters into an active, communicating state or into a nonactive, not-communicating state on the second transmission channel, and which desires to communicate or has communicated information to which was assigned a higher priority, respectively, placing a second code in the access field of a subsequent time slot on said first transmission channel; and the end station of the first transmission channel records, after receiving said priority codes, said numbers per priority of active access units having equal priorities on the second transmission channel and passes a value of a ratio between said recorded numbers per priority to the head station of the second transmission channel.

* * * * *